United States Patent
Bregman et al.

(10) Patent No.: US 11,323,342 B1
(45) Date of Patent: May 3, 2022

(54) HOST AUTO ROLE CLASSIFIER

(71) Applicant: Red Hat, Inc., Raleigh, NC (US)

(72) Inventors: Arie Bregman, Raanana (IL); Ilan Gersht, Raanana (IL); Avraham Talmor, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/084,415

(22) Filed: Oct. 29, 2020

(51) Int. Cl.
*H04L 12/26* (2006.01)
*H04L 29/08* (2006.01)
*H04L 29/06* (2006.01)
*H04L 43/062* (2022.01)
*H04L 43/0882* (2022.01)
*H04L 67/51* (2022.01)
*H04L 67/01* (2022.01)
*H04L 43/0817* (2022.01)

(52) U.S. Cl.
CPC ........ *H04L 43/062* (2013.01); *H04L 43/0817* (2013.01); *H04L 43/0882* (2013.01); *H04L 67/16* (2013.01); *H04L 67/42* (2013.01)

(58) Field of Classification Search
CPC .............. H04L 43/062; H04L 43/0817; H04L 43/0882; H04L 67/16; H04L 67/42
See application file for complete search history.

(56) References Cited

U.S. PATENT DOCUMENTS

| | | | |
|---|---|---|---|
| 10,686,682 B2 | 6/2020 | Navare et al. | |
| 2004/0050652 A1* | 3/2004 | Voser | G07F 9/002 194/302 |
| 2011/0153811 A1* | 6/2011 | Jeong | H04L 63/14 709/224 |
| 2014/0187177 A1* | 7/2014 | Sridhara | G06N 5/003 455/73 |
| 2016/0034809 A1* | 2/2016 | Trenholm | G06F 8/35 706/20 |

FOREIGN PATENT DOCUMENTS

| | | |
|---|---|---|
| CN | 107967488 A | 4/2018 |
| CN | 109818782 A | 5/2019 |

OTHER PUBLICATIONS

Alexis Lê-Quôc, "Monitoring 101: Collecting the right data," Datadog, blog post, Jun. 30, 2015, downloaded on Jul. 27, 2020, located at https://www.datadoghq.com/blog/monitoring-101-collecting-data/.

* cited by examiner

*Primary Examiner* — El Hadji M Sall
(74) *Attorney, Agent, or Firm* — Womble Bond Dickinson (US) LLP

(57) ABSTRACT

A method includes receiving one or more characteristics associated with a server of a datacenter. The method further includes analyzing, by a processing device, the one or more characteristics to determine a classification of the server. The method further includes, in view of the determined classification of the server, modifying one or more configurations of the server to increase performance for one or more functionalities corresponding to the determined classification.

18 Claims, 5 Drawing Sheets

HOST AUTO ROLE CLASSIFIER

TECHNICAL FIELD

Aspects of the present disclosure relate to auto classifiers and more specifically, to a host auto classifiers based on server classification.

BACKGROUND

In computing, a server is a piece of computer hardware or software (computer program) that provides functionality for other programs or devices, called "clients." This architecture is called the client-server model. Servers can provide various functionalities, often called "services," such as sharing data or resources among multiple clients, or performing computation for a client. A single server can serve multiple clients, and a single client can use multiple servers. A client process may run on the same device or may connect over a network to a server on a different device.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

In one embodiment, a host auto classifier based on server classification is described. As described herein, a server may be a piece of computer hardware or software (computer program) that provides functionality for other programs or devices, called "clients." This architecture is called the client-server model. Servers can provide various functionalities, often called "services," such as sharing data or resources among multiple clients, or performing computation for a client. In one embodiment, servers may be classified according to "roles" (e.g., primary functionalities or responsibilities of the servers). Examples of server roles may include, but are not limited to, database servers, file servers, mail servers, print servers, web servers, game servers, and application servers.

Advantageously, almost every type of server can be optimized based on its role. For example, if a server is a network server, TCP optimization may be configured. If the server is a security/firewall server, the server may be optimized against DDOS attacks. Proper optimization requires that such servers are first of all categorized correctly.

Problematically, identifying a server role is difficult for a variety of reasons. Some organizations manage hundreds or thousands of servers and try to manage the classification of servers using methods like hostname or spreadsheets, but these methods are often prone to human errors as such methods primarily depend on proactive and precise human behavior. Furthermore, a server lifecycle might include a transition from one role to another, and such transitions are time consuming and difficult to track, especially over the entire duration of a server's lifecycle. Without proper tracking, server roles become even more difficult and time consuming to classify, as such requires one-by-one analysis and recordation by a human.

Without proper classification, server functionality may not be optimized, leading to subpar performance and wasted compute power and resources. When multiplied by the large number of servers maintained by many of today's companies, the problems described above are compounded and lead to massive inefficiencies.

In response to the problems described above, and others, automation of server classification is described herein. To make the optimization process automated today, a mechanism for classifying servers as network, security, storage, gaming, database, web, compute, etc. is described. In some embodiments, such optimizations may be run on entire datacenters without human intervention.

Figure 1A:
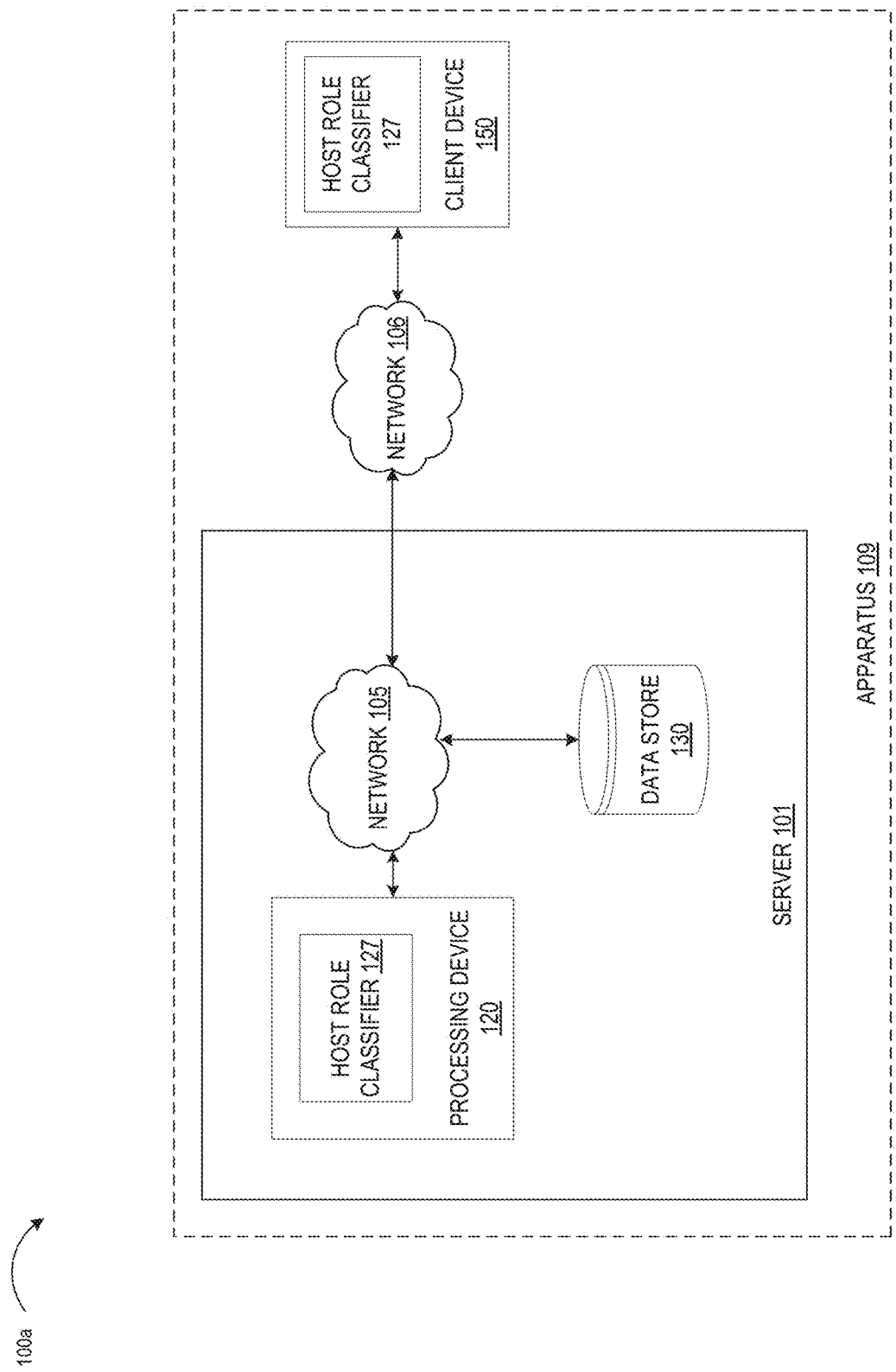
FIG. 1A is a block diagram that illustrates a first example system, in accordance with some embodiments of the present disclosure.

Advantageously, the embodiments of the present disclosure overcome the above, another other, challenges by providing for a host auto classifier based on server classifications. In one embodiment, such FIG. 1A is a block diagram that illustrates a first example system 100a, in accordance with some embodiments of the present disclosure. As discussed herein, host role classifier 127 may include logic that enables the operations and systems described herein, when executed. In one embodiment, system 100a may be described as an apparatus 109, including means for performing the operations described herein (e.g., server 101, network 106, client device 150, etc.). In one embodiment, host role classifier 127 resides in whole or in part on a server (e.g., server 101) of system 100a. In another embodiment, host role classifier 127 resides in whole or in part on a client device (e.g., client device 150) of system 100a. In yet another embodiment, host role classifier 127 resides in whole or in part on any combination of the two, or in a different system entirely.

Server 101 may include various components, which may allow host role classifier 127 to run on a server device or client device. Each component may perform different functions, operations, actions, processes, methods, etc., for the embodiments described herein and/or may provide different services, functionalities, and/or resources for the embodiments described herein.

As illustrated in FIG. 1A, server 101 includes a host role classifier 127, a computing processing device 120, a data store 130, and a network 105. The host role classifier 127, the processing device 120, and the data store 130 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc.

The network 105 may carry communications (e.g., data, message, packets, frames, etc.) between the various components of server 101. The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs)), memory (e.g., random access memory (RAM)), storage devices (e.g., hard-disk drive (HDD), solid-state drive (SSD), etc.), and other hardware devices (e.g., sound card, video card, etc.). The server 101 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

In one embodiment, server 101 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 101. Client device 150 may include host role classifier 127, in addition to, or alternatively from, server 101. Further implementation details of the operations performed by system 101 are described with respect to FIGS. 1B-4.

Figure 1B:
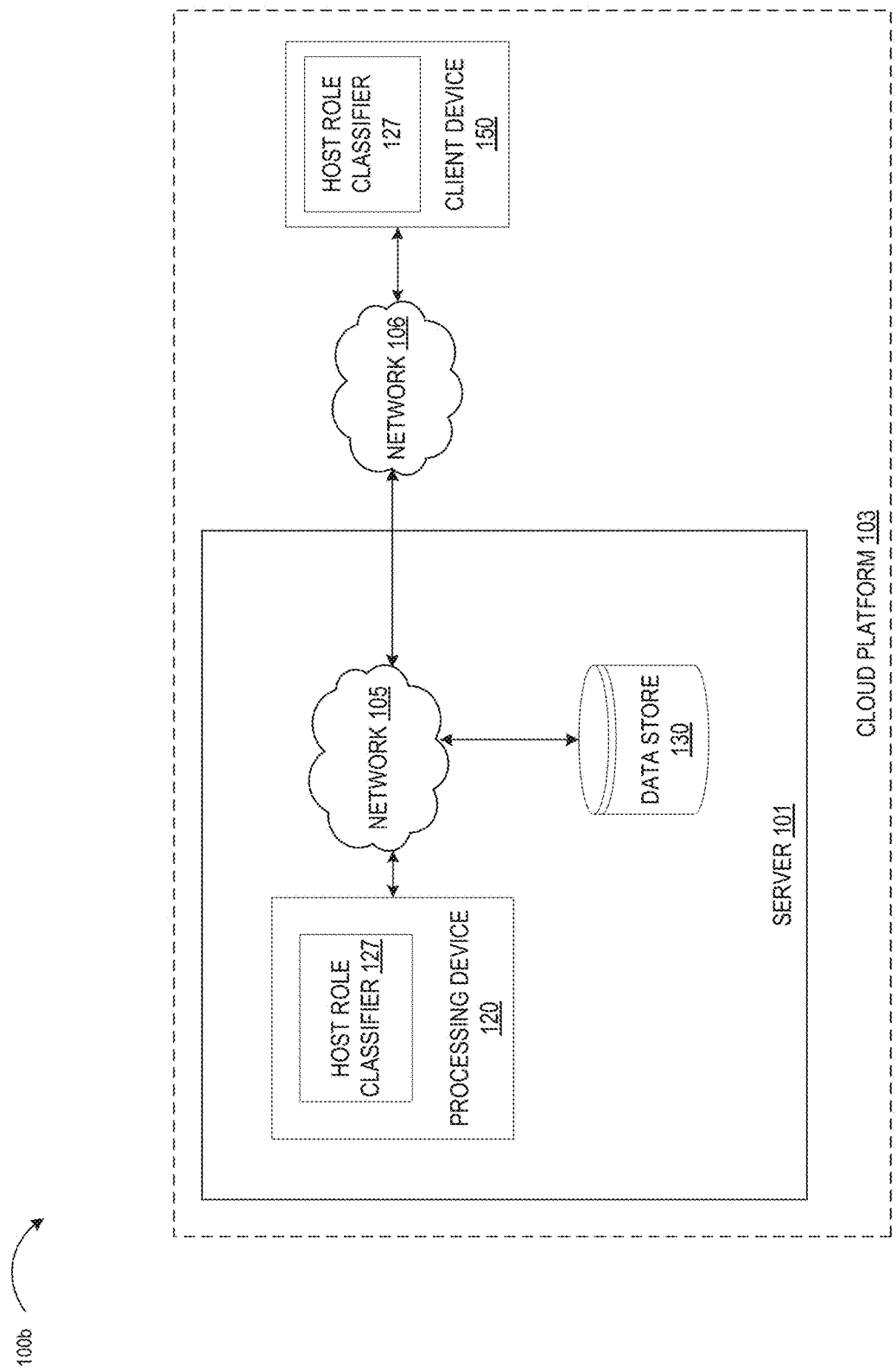
FIG. 1B is a block diagram that illustrates a second example system, in accordance with some embodiments of the present disclosure.

FIG. 1B is a block diagram that illustrates a second example system 100*b*, in accordance with some embodiments of the present disclosure. System 100*b* includes a cloud platform 103, which may include one or more components. As discussed herein, host role classifier 127 may include logic that enables the operations and systems described herein, when executed. In one embodiment, system 100*b* may be described as a cloud platform 103, including means for performing the operations described herein (e.g., server 101, network 106, client device 150, etc.). In one embodiment, host role classifier 127 resides in whole or in part on a server (e.g., server 101) of system 100*b*. In another embodiment, host role classifier 127 resides in whole or in part on a client device (e.g., client device 150) of system 100*b*. In yet another embodiment, host role classifier 127 resides in whole or in part on any combination of the two, or in a different system entirely.

Server 101 may include various components, which may allow host role classifier 127 to run on a server device or client device. Each component may perform different functions, operations, actions, processes, methods, etc., for the embodiments described herein and/or may provide different services, functionalities, and/or resources for the embodiments described herein.

As illustrated in FIG. 1B, server 101 includes a host role classifier 127, a computing processing device 120, a data store 130, and a network 105. The host role classifier 127, the processing device 120, and the data store 130 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc.

The network 105 may carry communications (e.g., data, message, packets, frames, etc.) between the various components of server 101. The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs)), memory (e.g., random access memory (RAM)), storage devices (e.g., hard-disk drive (HDD), solid-state drive (SSD), etc.), and other hardware devices (e.g., sound card, video card, etc.). The server 101 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

In one embodiment, server 101 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 101. Client device 150 may include host role classifier 127, in addition to, or alternatively from, server 101. Further implementation details of the operations performed by system 101 are described with respect to FIGS. 1A and 1C-4.

Figure 1C:
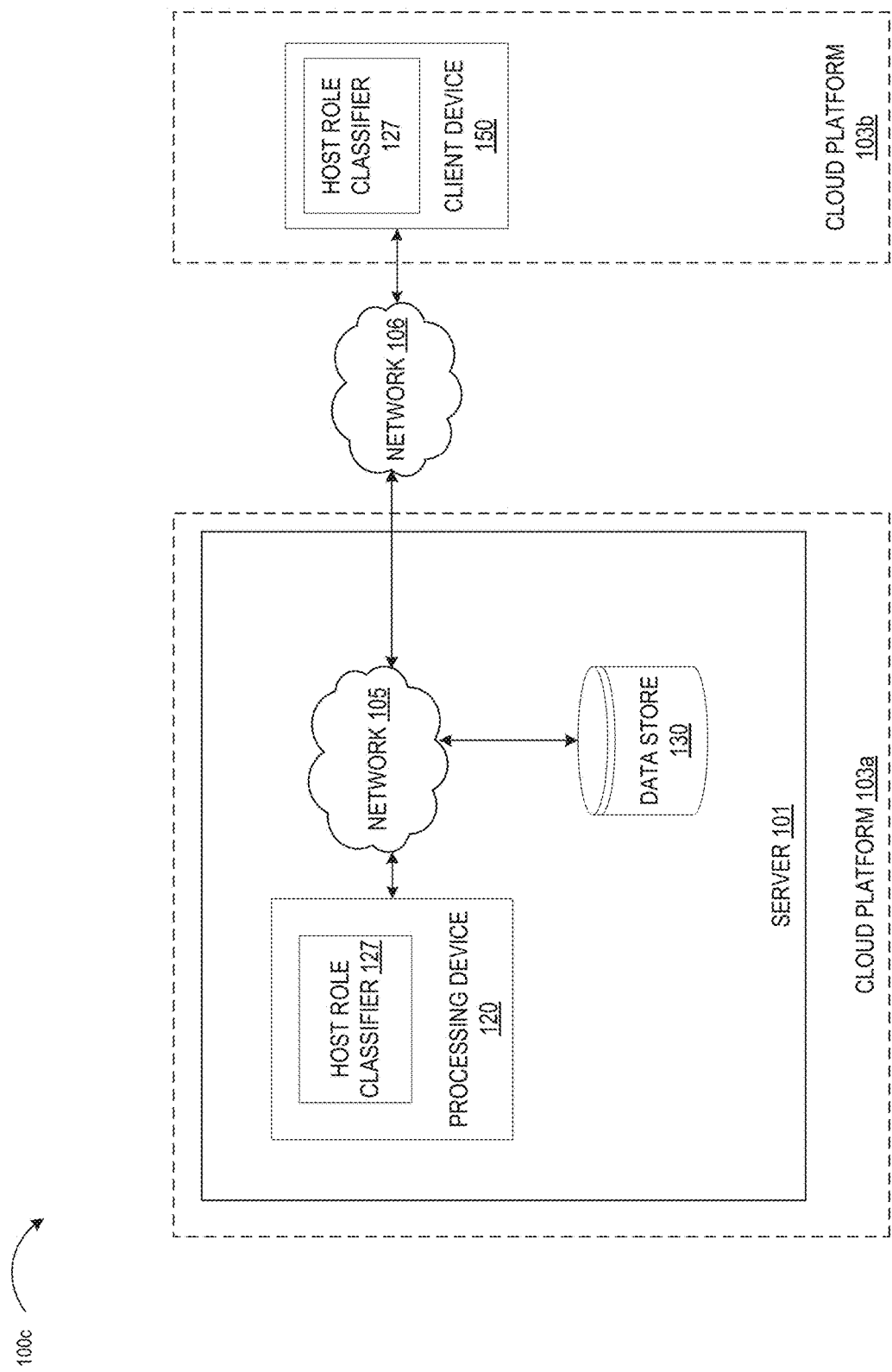
FIG. 1C is a block diagram that illustrates a third example system, in accordance with some embodiments of the present disclosure.

FIG. 1C is a block diagram that illustrates a third example system 100c, in accordance with some embodiments of the present disclosure. System 100b includes one or more cloud platforms 103a and 103b, which may include one or more components. As discussed herein, host role classifier 127 may include logic that enables the operations and systems described herein, when executed. In one embodiment, system 100c may be described as a cloud platforms 103a and/or 103b, including means for performing the operations described herein (e.g., server 101, network 106, client device 150, etc.). In one embodiment, host role classifier 127 resides in whole or in part on a server (e.g., server 101) of system 100c. In another embodiment, host role classifier 127 resides in whole or in part on a client device (e.g., client device 150) of system 100c. In yet another embodiment, host role classifier 127 resides in whole or in part on any combination of the two, or in a different system entirely.

Server 101 may include various components, which may allow host role classifier 127 to run on a server device or client device. Each component may perform different functions, operations, actions, processes, methods, etc., for the embodiments described herein and/or may provide different services, functionalities, and/or resources for the embodiments described herein.

As illustrated in FIG. 1C, server 101 includes a host role classifier 127, a computing processing device 120, a data store 130, and a network 105. The host role classifier 127, the processing device 120, and the data store 130 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc.

The network 105 may carry communications (e.g., data, message, packets, frames, etc.) between the various components of server 101 and/or between a variety of cloud platforms (e.g., 103a and 103b). The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs)), memory (e.g., random access memory (RAM)), storage devices (e.g., hard-disk drive (HDD), solid-state drive (SSD), etc.), and other hardware devices (e.g., sound card, video card, etc.). The server 101 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

In one embodiment, server 101 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 101. Client device 150 may include host role classifier 127, in addition to, or alternatively from, server 101. Further implementation details of the operations performed by system 101 are described with respect to FIGS. 1A-B and 2-4.

Figure 2:
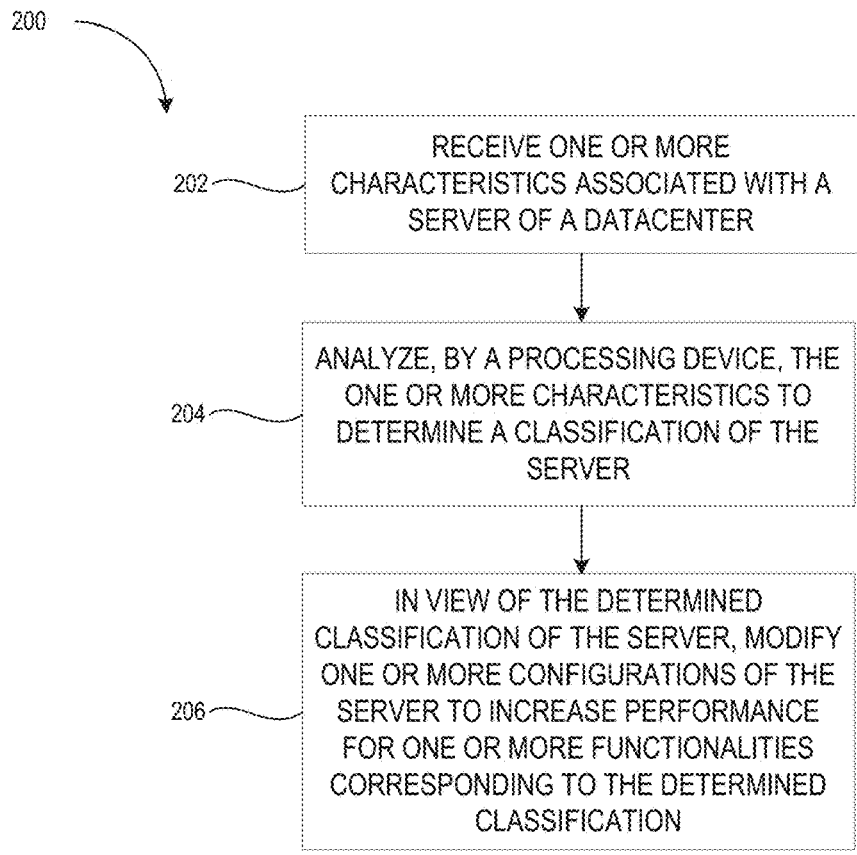
FIG. 2 is a flow diagram of a first method of the host auto role classifier, in accordance with some embodiments of the present disclosure.

FIG. 2 is a flow diagram of a first method 200 of the host auto role classifier, in accordance with some embodiments of the present disclosure. The method 200 may be performed by processing logic that comprises hardware (e.g., circuitry, dedicated logic, programmable logic, microcode, etc.), software (e.g., instructions run on a processing device to perform hardware simulation), or a combination thereof. In one embodiment, processing logic corresponding to one or more components of FIG. 1A-C may perform one or more of the following operations. For example, in one embodiment, processing logic of processing device 120 performs the following operations, with respect to the individual components of FIG. 1A-C. In another embodiment, any other suitable processing device may perform the described operations.

Referring to FIG. 2, at block 202, processing logic may receive one or more characteristics associated with a server of a datacenter. In another embodiment, the server does not necessarily reside in, or as part of, a datacenter. In one embodiment, such characteristics may include, for example:

Network Traffic—This may include determining the type of traffic flowing in and out of the server.

Ports—E.g., which ports are open. For example, port 80 may mean that HTTP is used on the server.

Input/Output (I/O)—For example, if there is high I/O over a long period it might indicate the server is a file server.

Logs—Logs may provide an indication of information of actions that been made on the server and help classify it.

Processes—For example, by determining what is running, some part of the purpose of the server may be determined.

Kernel Parameters—E.g., processing logic may scan loaded modules and parameters' values.

Packages—For example, by determining packages that are installed on the server, the classification analysis and determination may be focused in a specific area (for example, to determine if a server is indeed a file server processing logic may search for nfs, netapp, emc, packages).

At block 204, processing logic may analyze (e.g., by a processing device) the one or more characteristics to determine a classification of the server. In one embodiment, the processing logic may make an accurate classification based off of a single characteristic of the server. In other embodiments, analysis of two or more characteristics may be required to make an accurate determination. In a variety of embodiments, characteristics may be analyzed according to the type of characteristic. For example, in one embodiment, the one or more characteristics may include network traffic characteristics, and analyzing the one or more characteristics may include determining a type of the network traffic.

In another embodiment, the one or more characteristics may include port characteristics, and analyzing the one or more characteristics may include determining an open port on the server. In another embodiment, the one or more characteristics may include input/output characteristics, and analyzing the one or more characteristics may include determining that there exists a high input/input to or from the server over a defined period of time.

In another embodiment, the one or more characteristics may include log characteristics, and analyzing the one or more characteristics may include determining one or more actions of server identified in the log characteristics. In another embodiment, the one or more characteristics may include process characteristics, and analyzing the one or more characteristics may include determining one or more processes run by the server.

In another embodiment, the one or more characteristics may include kernel parameter characteristics, and analyzing the one or more characteristics may include scanning one or more loaded modules or parameter values of the server. In another embodiment, the one or more characteristics may include package characteristics, and analyzing the one or more characteristics may include analyzing one or more packages installed on the server. As described above, in one embodiment the analyzing may be performed in view of at least two characteristics of the one or more characteristics. In another embodiment, a single characteristic may be used to perform the classification. Notably, the characteristics described herein are not exhaustive. For example, other characteristics that may be analyzed include those related to security firewall inputs, hardware profiles, directories and files—paths on the system, disk usage, CPU and memory, etc.

At block 206, in view of the determined classification of the server, processing logic may modify one or more configurations (settings, features, functionalities, resource allocations, etc.) of the server to increase performance for one or more functionalities corresponding to the determined classification. In one embodiment, such modification may result in a single task being optimized. In another embodiment, more than one task of the server may be optimized in view of the classification.

By way of non-limiting example of the described method, in one embodiment the one or more characteristics may include network traffic characteristics and web port characteristics, and analyzing the one or more characteristics results in determining that the server is a web server. In such a case, configuration of the server may be modified to optimize functionality related to web servers (e.g., maximize throughput and bandwidth). In another example, processing logic may detect a major write to disk number of events (e.g., above a threshold), constant I/O events, a large number of mount points, file transfer ports are in use (e.g., 20, 21,22), detection of storage-related packages, and/or found configuration files, each of which separately or together may indicate that the server is a storage server. In such a case, read and write functionality or other storage-related functionality may be optimized via a reconfiguration of the server.

Figure 3:
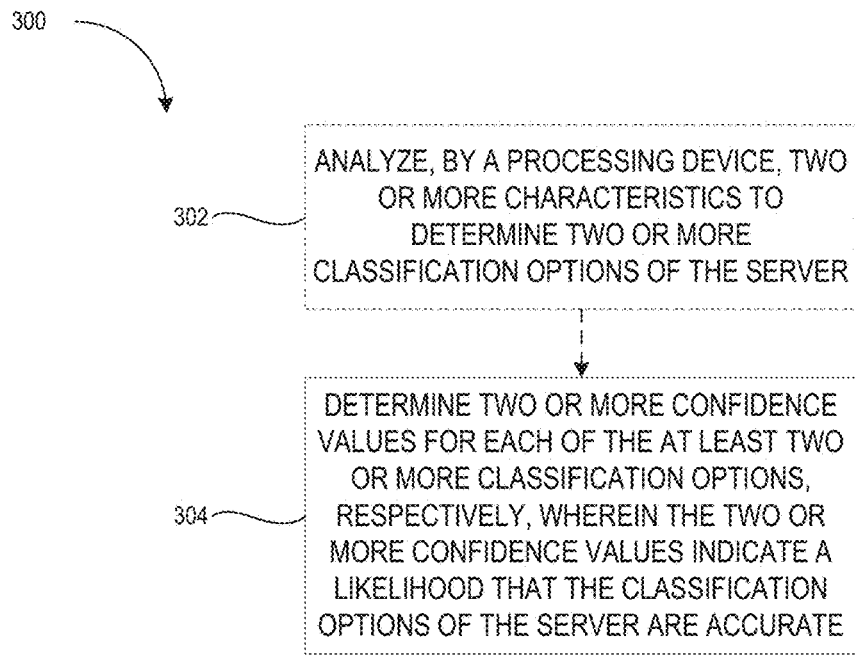
FIG. 3 is a flow diagram of a second method of the host auto role classifier, in accordance with some embodiments of the present disclosure.

FIG. 3 is a flow diagram of a second method 300 of the host auto role classifier, in accordance with some embodiments of the present disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. In one embodiment, processing logic corresponding to one or more components of FIG. 1A-C may perform one or more of the following operations. For example, in one embodiment, processing logic of processing device 120 performs the following operations, with respect to the individual components of FIG. 1A-C. In another embodiment, any other suitable processing device may perform the described operations.

Referring to FIG. 3, at block 302, processing logic may analyze (e.g., by a processing device) two or more characteristics to determine two or more classification options of a server. In another embodiment, a single characteristic may be analyzed. Once analyzed, processing logic at block 304 may determine two or more confidence values for each of the at least two classification options, respectively (e.g., a first confidence value corresponding to the first option, and a second confidence value corresponding to the second option). In one embodiment, the two or more confidence values indicate a likelihood that the classification of the server is accurate. In one embodiment, the classification is based on multiple categories with a determined percentage-based confidence value indicating whether a classification is accurate and which metrics were used to classify it.

Confidence values may be computed using any number of suitable statistical models, and may be combined also using any number of models. In other embodiment, the values may simply be totaled (or weighted and totaled) to determine a final confidence score (value) based on the individual confidence values. For example, in one embodiment a result of a classification analysis may be similar to: Web server-70% confidence, Storage server-30% confidence. In such a case, it may be determined that the server is a web server. In some embodiment, a confidence level must be above a confidence threshold (e.g., 50%, 75%, 90%, etc.) to provide a determination of the classification.

As described herein, any number of characteristics may be used to determine a classification. The following non-exhaustive list is provided by way of example:

Packages: List and inspect packages installed on the system. It is possible to classify each package to a specific area or product. For example, with a simple rpm -qi command, one can extract fields like Group, Description, and Summary which may determine if a certain package is related to the database, HTTP server, etc.

Ports: Certain ports serve specific purposes, like port 80 which is used for HTTP. By inspecting the ports on a certain server, processing logic may increase the classification probability.

Resource Consumption: Processing logic may check which processes or applications are most demanding from a resources perspective. It may be the case that for database (DB) or storage servers, for example, the most demanding process is the one installed on the host so that it can serve its purpose. In other words, it can be assumed that in a DB host the most demanding process will be the DB itself or a resource related to that process (e.g., a worker that can eventually be linked to the DB with process tree/inheritance).

Inspect the hardware: It may be beneficial to identify whether a certain host has special hardware specification by inspecting the hardware with different commands and paths such as lshw, lspci, dmidecode, . . . which can be parsed to identify whether GPU cards are installed or whether there is anything that is not ordinary for "normal" or common hosts. This can also increase the probability of whether a certain host is for example used for artificial intelligence or computational mathematics.

Network Traffic—Examination of packets may provide a lot of information. Packets have source and destination information, and processing logic knows where they are destined, based on layer 7 in the OSI model. As such, processing logic can classify traffic based on different patterns inspected with packet sniffers.

Logs—Logs may provide information related to actions that been made on the server and thus may help classify it. Processing logic is able to parse the logs with existing tools for getting the information needed, such as GET/SET commands, ports, and messages.

I/O—If there is high I/O over a long period it might indicate the server is a file server. Processing logic may receive I/O information and analyze which process is producing it, so there is a high probability that even non-high I/O but constant (or non-constant but for long periods) is generated by the main application running on the host. Also, no I/O at all (minimal) can indicate other information, such as the host being a network host perhaps (which can be confirmed by the intersection of I/O data with network patterns).

Processes—By viewing what is running, processing logic may determine some part of the purpose of the server. Also, determining which process is running helps to classify if this service is active or not. For example, processing logic determines that httpd rpm is installed, processing logic may estimate that it might be a web server, but if processing logic determines that the service is down it can indicate that it is not an active web server.

Kernel Parameters—Processing logic may scan loaded modules and parameters' values.

This by itself may not be enough to classify a host but can increase probability for classification based on other data. In one example, the result of one classification is that a certain host is a router host, which is used only for forwarding packets. If the kernel parameter that allows forwarding is disabled, then processing logic may disprove that assumption/initial classification.

Security/Firewall—Certain roles can indicate what is the purpose of the host. Determining rules enabled by the administrator (e.g., not default rules) may increase the probability of previous classification result.

Paths—Certain predefined paths can be checked and linked to processes in order to strengthen the previous classification. For example, if a path like /var/www is used then it might indicate the content is being served and this assumption can be verified by inspecting the processes and configuration of running processes.

Disk Usage—Processing logic can estimate from disk metrics whether the server is meant to hold a large amount of data. For example, on Linux servers, processing logic may use the "df -h" command and retrieve the disk sizes. On Windows servers processing logic can use diskmgmt.msc. If the server has one or more disks that hold multiple Terabytes of storage, for example, processing logic may analyze how it's used. By answering questions like "is the server writing there? Is it only reading from it? Which process is associated with using these terabytes of storage? Which package installed that process? Which user ran the process?, etc. . . . ", processing logic can increase the probability of the mechanism to classify the host.

Figure 4:
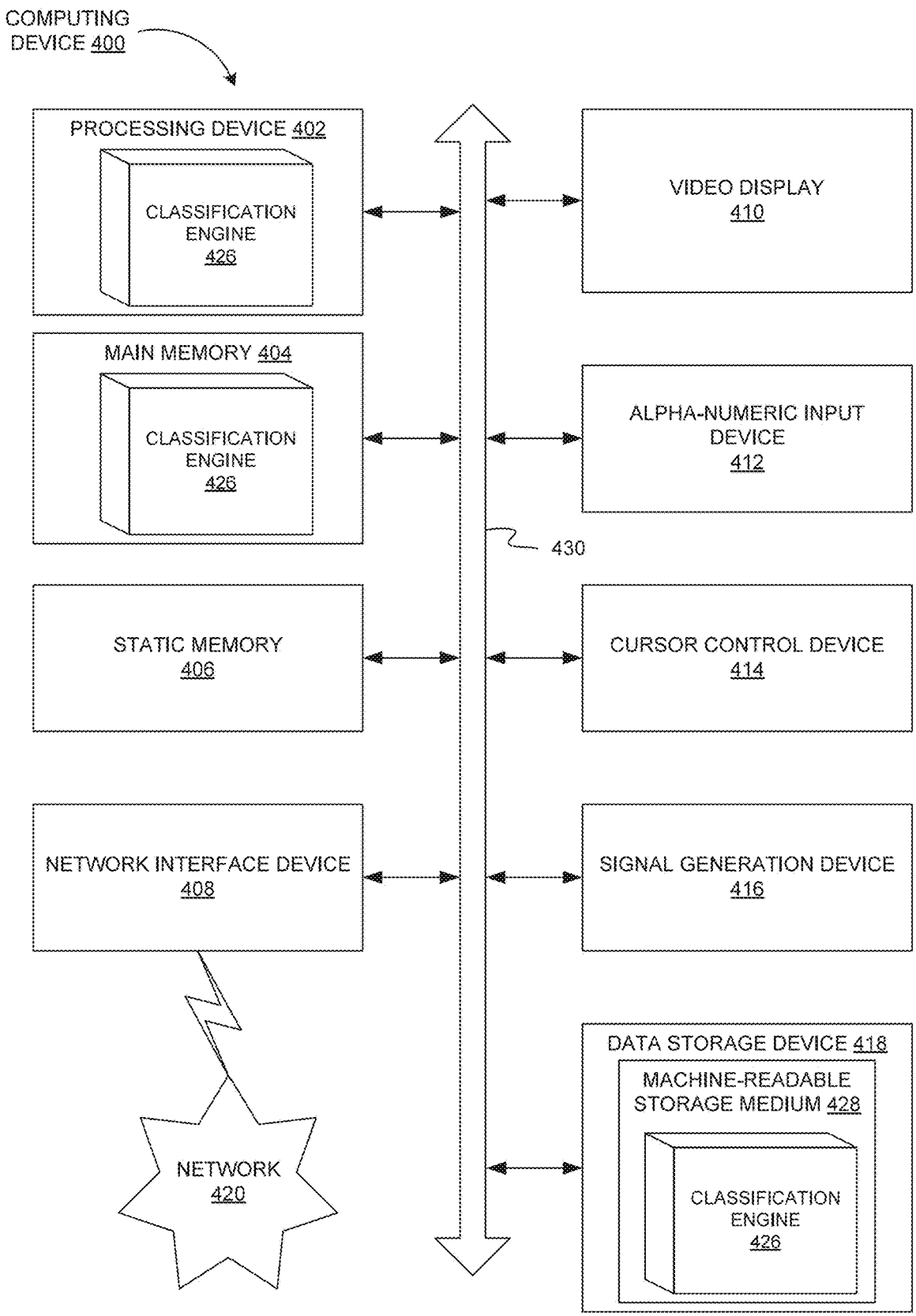
FIG. 4 is a block diagram of an example computing device that may perform one or more of the operations described herein, in accordance with some embodiments of the present disclosure.

FIG. 4 is a block diagram of an example computing device 400 that may perform one or more of the operations described herein, in accordance with some embodiments of the present disclosure. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also comprise one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein. In one embodiment, processing device 402 represents processing device 120 of FIG. 1A. In another embodiment, processing device 402 represents a processing device of a client device (e.g., client device 150 of FIG. 1A).

Computing device 400 may further include a network interface device 408 which may communicate with a network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions, e.g., instructions for carrying out the operations described herein, in accordance with one or more aspects of the present disclosure. Instructions implementing classification engine 426 may also reside, completely or at least partially, within main memory 404 and/or within processing device 402 during execution thereof by computing device 400, main memory 404 and processing device 402 also constituting computer-readable media. The instructions may further be transmitted or received over a network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method, comprising: receiving one or more characteristics associated with a server of a datacenter; analyzing, by a processing device, the one or more characteristics to determine a classification of the server; and in view of the determined classification of the server, modifying one or more configurations of the server to increase performance for one or more functionalities corresponding to the determined classification.

Example 2 is the method of Example 1, wherein the one or more characteristics comprise network traffic characteristics, and wherein analyzing the one or more characteristics comprises determining a type of the network traffic.

Example 3 is the method of Example 1, wherein the one or more characteristics comprise port characteristics, and wherein analyzing the one or more characteristics comprises determining an open port on the server.

Example 4 is the method of Example 1, wherein the one or more characteristics comprise input/output characteristics, and wherein analyzing the one or more characteristics comprises determining that there exists a high input/input to or from the server over a defined period of time.

Example 5 is the method of Example 1, wherein the one or more characteristics comprise log characteristics, and wherein analyzing the one or more characteristics comprises determining one or more actions of server identified in the log characteristics.

Example 6 is the method of Example 1, wherein the one or more characteristics comprise process characteristics, and wherein analyzing the one or more characteristics comprises determining one or more processes run by the server.

Example 7 is the method of Example 1, wherein the one or more characteristics comprise kernel parameter characteristics, and wherein analyzing the one or more characteristics comprises scanning one or more loaded modules or parameter values of the server.

Example 8 is the method of Example 1, wherein the one or more characteristics comprise package characteristics, and wherein analyzing the one or more characteristics comprises analyzing one or more packages installed on the server.

Example 9 is the method of Example 1, wherein the analyzing is performed in view of at least two characteristics of the one or more characteristics.

Example 10 is the method of Example 9, further comprising determining two or more confidence values for each of two or more classification options, respectively, wherein the two or more confidence values indicate a likelihood that the two or more classification options of the server are accurate.

Example 11 is the method of Example 1, wherein the one or more characteristics comprise network traffic characteristics and web port characteristics, and wherein analyzing the one or more characteristics results in determining that the server is a web server.

Example 12 is a system, comprising: a memory to store one or more characteristics associated with a server; and a processing device operatively coupled to the memory, the processing device to: receive the one or more characteristics associated with the server; analyze the one or more characteristics to determine a classification of the server; and in view of the determined classification of the server, modify one or more configurations of the server to increase performance for one or more functionalities corresponding to the determined classification.

Example 13 is the system of Example 12, wherein the one or more characteristics comprise network traffic characteristics, and wherein to analyze the one or more characteristics the processing device is to determine a type of the network traffic.

Example 14 is the system of Example 12, wherein the one or more characteristics comprise port characteristics, and wherein to analyze the one or more characteristics the processing device is to determine an open port on the server.

Example 15 is the system of Example 12, wherein the one or more characteristics comprise input/output characteristics, and wherein to analyze the one or more characteristics the processing device is to determine that there exists a high input/input to or from the server over a defined period of time.

Example 16 is the system of Example 12, wherein the one or more characteristics comprise log characteristics, and wherein to analyze the one or more characteristics the processing device is to determine one or more actions of server identified in the log characteristics.

Example 17 is the system of Example 12, wherein the one or more characteristics comprise process characteristics, and wherein to analyze the one or more characteristics the processing device is to determine one or more processes run by the server.

Example 18 is the system of Example 12, wherein the one or more characteristics comprise kernel parameter characteristics, and wherein to analyze the one or more characteristics the processing device is to scan one or more loaded modules or parameter values of the server.

Example 19 is the system of Example 12, wherein the one or more characteristics comprise package characteristics, and wherein to analyze the one or more characteristics the processing device is to analyze one or more packages installed on the server.

Example 20 is the system of Example 12, wherein the analysis is performed in view of at least two characteristics of the one or more characteristics.

Example 21 is the system of Example 20, the processing device further to determine two or more confidence values for each of two or more classification options, respectively, wherein the two or more confidence values indicate a likelihood that the two or more classification options of the server are accurate.

Example 22 is the system of Example 12, wherein the one or more characteristics comprise network traffic characteristics and web port characteristics, and wherein analysis of the one or more characteristics results in a determination that the server is a web server.

Example 23 is a non-transitory computer-readable storage medium including instructions that, when executed by a processing device, cause the processing device to: receive one or more characteristics associated with a server; analyze, by the processing device, the one or more characteristics to determine a classification of the server; and in view of the determined classification of the server, modify one or more configurations of the server to increase performance for one or more functionalities corresponding to the determined classification.

Example 24 is the non-transitory computer-readable storage medium of Example 23, wherein the one or more characteristics comprise network traffic characteristics, and wherein to analyze the one or more characteristics the processing device is to determine a type of the network traffic.

Example 25 is the non-transitory computer-readable storage medium of Example 23, wherein the one or more characteristics comprise port characteristics, and wherein to analyze the one or more characteristics the processing device is to determine an open port on the server.

Example 26 is the non-transitory computer-readable storage medium of Example 23, wherein the one or more characteristics comprise input/output characteristics, and wherein to analyze the one or more characteristics the processing device is to determine that there exists a high input/input to or from the server over a defined period of time.

Example 27 is the non-transitory computer-readable storage medium of Example 23, wherein the one or more characteristics comprise log characteristics, and wherein to analyze the one or more characteristics the processing device is to determine one or more actions of server identified in the log characteristics.

Example 28 is the non-transitory computer-readable storage medium of Example 23, wherein the one or more characteristics comprise process characteristics, and wherein to analyze the one or more characteristics the processing device is to determine one or more processes run by the server.

Example 29 is the non-transitory computer-readable storage medium of Example 23, wherein the one or more characteristics comprise kernel parameter characteristics, and wherein to analyze the one or more characteristics the processing device is to scan one or more loaded modules or parameter values of the server.

Example 30 is the non-transitory computer-readable storage medium of Example 23, wherein the one or more characteristics comprise package characteristics, and wherein to analyze the one or more characteristics the processing device is to analyze one or more packages installed on the server.

Example 31 is the non-transitory computer-readable storage medium of Example 23, wherein the analysis is performed in view of at least two characteristics of the one or more characteristics.

Example 32 is the non-transitory computer-readable storage medium of Example 31, the processing device further to determine two or more confidence values for each of two or more classification options, respectively, wherein the two or more confidence values indicate a likelihood that the two or more classification options of the server are accurate.

Example 33 is an apparatus, comprising: means for receiving one or more characteristics associated with a server of a datacenter; means for analyzing, by a processing device, the one or more characteristics to determine a classification of the server; and in view of the determined classification of the server, means for modifying one or more configurations of the server to increase performance for one or more functionalities corresponding to the determined classification.

Example 34 is the apparatus of Example 33, wherein the one or more characteristics comprise network traffic characteristics, and wherein analyzing the one or more characteristics comprises means for determining a type of the network traffic.

Example 35 is the apparatus of Example 33, wherein the one or more characteristics comprise port characteristics, and wherein analyzing the one or more characteristics comprises means for determining an open port on the server.

Example 36 is the apparatus of Example 33, wherein the one or more characteristics comprise input/output characteristics, and wherein analyzing the one or more characteristics comprises means for determining that there exists a high input/input to or from the server over a defined period of time.

Example 37 is the apparatus of Example 33, wherein the one or more characteristics comprise log characteristics, and wherein analyzing the one or more characteristics comprises means for determining one or more actions of server identified in the log characteristics.

Example 38 is the apparatus of Example 33, wherein the one or more characteristics comprise process characteristics, and wherein analyzing the one or more characteristics comprises means for determining one or more processes run by the server.

Example 39 is the apparatus of Example 33, wherein the one or more characteristics comprise kernel parameter characteristics, and wherein analyzing the one or more characteristics comprises means for scanning one or more loaded modules or parameter values of the server.

Example 40 is the apparatus of Example 33, wherein the one or more characteristics comprise package characteristics, and wherein analyzing the one or more characteristics comprises means for analyzing one or more packages installed on the server.

Example 41 is the apparatus of Example 33, wherein the analyzing is performed in view of at least two characteristics of the one or more characteristics.

Example 42 is the apparatus of Example 41, further comprising means for determining two or more confidence values for each of two or more classification options, respectively, wherein the two or more confidence values indicate a likelihood that the two or more classification options of the server are accurate.

Example 43 is the apparatus of Example 33, wherein the one or more characteristics comprise network traffic characteristics and web port characteristics, and wherein analyzing the one or more characteristics results in determining that the server is a web server.

Example 44 is a cloud platform, comprising: a memory to store one or more characteristics associated with a server; and a processing device operatively coupled to the memory, the processing device to: receive the one or more characteristics associated with the server; analyze the one or more characteristics to determine a classification of the server; and in view of the determined classification of the server, modify one or more configurations of the server to increase performance for one or more functionalities corresponding to the determined classification.

Example 45 is the cloud platform of Example 44, wherein the one or more characteristics comprise network traffic characteristics, and wherein to analyze the one or more characteristics the processing device is to determine a type of the network traffic.

Example 46 is the cloud platform of Example 44, wherein the one or more characteristics comprise port characteristics, and wherein to analyze the one or more characteristics the processing device is to determine an open port on the server.

Example 47 is the cloud platform of Example 44, wherein the one or more characteristics comprise input/output characteristics, and wherein to analyze the one or more characteristics the processing device is to determine that there exists a high input/input to or from the server over a defined period of time.

Example 48 is the cloud platform of Example 44, wherein the one or more characteristics comprise log characteristics, and wherein to analyze the one or more characteristics the processing device is to determine one or more actions of server identified in the log characteristics.

Example 49 is the cloud platform of Example 44, wherein the one or more characteristics comprise process characteristics, and wherein to analyze the one or more characteristics the processing device is to determine one or more processes run by the server.

Example 50 is the cloud platform of Example 44, wherein the one or more characteristics comprise kernel parameter characteristics, and wherein to analyze the one or more characteristics the processing device is to scan one or more loaded modules or parameter values of the server.

Example 51 is the cloud platform of Example 44, wherein the one or more characteristics comprise package characteristics, and wherein to analyze the one or more characteristics the processing device is to analyze one or more packages installed on the server.

Example 52 is the cloud platform of Example 44, wherein the analysis is performed in view of at least two characteristics of the one or more characteristics.

Example 53 is the cloud platform of Example 52, the processing device further to determine two or more confidence values for each of two or more classification options, respectively, wherein the two or more confidence values indicate a likelihood that the two or more classification options of the server are accurate.

Example 54 is the cloud platform of Example 44, wherein the one or more characteristics comprise network traffic characteristics and web port characteristics, and wherein analysis of the one or more characteristics results in a determination that the server is a web server.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to"

perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
receiving one or more characteristics associated with a server of a datacenter, wherein the one or more characteristics comprise one or more of: network traffic characteristics of the server, port characteristics of the server, input/output characteristics of the server, log characteristics of the server, process characteristics of the server, resource consumption characteristics of the server, hardware characteristics of the server, kernel parameter characteristics of the server, security characteristics of the server, storage characteristics of the server, or package characteristics of the server;
analyzing, by a processing device, the one or more characteristics;
determining a classification of the server in view of at least two characteristics of the one or more characteristics of the server;
determining two or more confidence values for each of two or more classification options, respectively, wherein the two or more confidence values indicate a likelihood that the two or more classification options of the server are accurate; and
responsive to determining the classification of the server, modifying a configuration of the server associated with one or more functionalities corresponding to the determined classification.

2. The method of claim 1, wherein the one or more characteristics comprise network traffic characteristics, and wherein analyzing the one or more characteristics comprises determining a type of the network traffic.

3. The method of claim 1, wherein the one or more characteristics comprise port characteristics, and wherein analyzing the one or more characteristics comprises determining an open port on the server.

4. The method of claim 1, wherein the one or more characteristics comprise input/output characteristics, and wherein analyzing the one or more characteristics comprises determining that there exists a high input/input to or from the server over a defined period of time.

5. The method of claim 1, wherein the one or more characteristics comprise log characteristics, and wherein analyzing the one or more characteristics comprises determining one or more actions of the server identified in the log characteristics.

6. The method of claim 1, wherein the one or more characteristics comprise process characteristics, and wherein analyzing the one or more characteristics comprises determining one or more processes run by the server.

7. The method of claim 1, wherein the one or more characteristics comprise kernel parameter characteristics, and wherein analyzing the one or more characteristics comprises scanning one or more loaded modules or parameter values of the server.

8. The method of claim 1, wherein the one or more characteristics comprise package characteristics, and wherein analyzing the one or more characteristics comprises analyzing one or more packages installed on the server.

9. The method of claim 1, wherein the one or more characteristics comprise network traffic characteristics and port characteristics, and wherein analyzing the one or more characteristics results in determining the classification of the server as a web server.

10. A system, comprising:
a memory to store one or more characteristics associated with a server; and
a processing device operatively coupled to the memory, the processing device to:
receive the one or more characteristics associated with the server, wherein the one or more characteristics comprise one or more of: network traffic characteristics of the server, port characteristics of the server, input/output characteristics of the server, log characteristics of the server, process characteristics of the server, resource consumption characteristics of the server, hardware characteristics of the server, kernel parameter characteristics of the server, security characteristics of the server, storage characteristics of the server, or package characteristics of the server;
analyze the one or more characteristics;
determine a classification of the server in view of at least two characteristics of the one or more characteristics of the server;
determine two or more confidence values for each of two or more classification options, respectively, wherein the two or more confidence values indicate a likelihood that the two or more classification options of the server are accurate; and responsive to determining the classification of the server, modify a configuration of the server associated with one or more functionalities corresponding to the determined classification.

11. The system of claim 10, wherein the one or more characteristics comprise network traffic characteristics, and wherein to analyze the one or more characteristics the processing device is to determine a type of the network traffic.

12. The system of claim 10, wherein the one or more characteristics comprise port characteristics, and wherein to analyze the one or more characteristics the processing device is to determine an open port on the server.

13. The system of claim 10, wherein the one or more characteristics comprise input/output characteristics, and wherein to analyze the one or more characteristics the processing device is to determine that there exists a high input/input to or from the server over a defined period of time.

14. The system of claim 10, wherein the one or more characteristics comprise log characteristics, and wherein to analyze the one or more characteristics the processing device is to determine one or more actions of the server identified in the log characteristics.

15. A non-transitory computer-readable storage medium including instructions that, when executed by a processing device, cause the processing device to:
receive one or more characteristics associated with a server, wherein the one or more characteristics comprise one or more of: network traffic characteristics of the server, port characteristics of the server, input/output characteristics of the server, log characteristics of the server, process characteristics of the server, resource consumption characteristics of the server, hardware characteristics of the server, kernel parameter characteristics of the server, security characteristics of the server, storage characteristics of the server, or package characteristics of the server;
analyze, by the processing device, the one or more characteristics;
determine a classification of the server in view of at least two characteristics of the one or more characteristics of the server;
determine two or more confidence values for each of two or more classification options, respectively, wherein the two or more confidence values indicate a likelihood that the two or more classification options of the server are accurate; and
responsive to determining the classification of the server, modify a configuration of the server associated with one or more functionalities corresponding to the determined classification.

16. The non-transitory computer-readable storage medium of claim 15, wherein the one or more characteristics comprise process characteristics, and wherein to analyze the one or more characteristics the processing device is to determine one or more processes run by the server.

17. The non-transitory computer-readable storage medium of claim 15, wherein the one or more characteristics comprise kernel parameter characteristics, and wherein to analyze the one or more characteristics the processing device is to scan one or more loaded modules or parameter values of the server.

18. The non-transitory computer-readable storage medium of claim 15, wherein the one or more characteristics comprise package characteristics, and wherein to analyze the one or more characteristics the processing device is to analyze one or more packages installed on the server.

* * * * *